May 17, 1927.
M. C. RIDENOUR
1,628,914
STEERING CONNECTING ROD FOR AUTOMOBILES
Filed Dec. 11, 1925
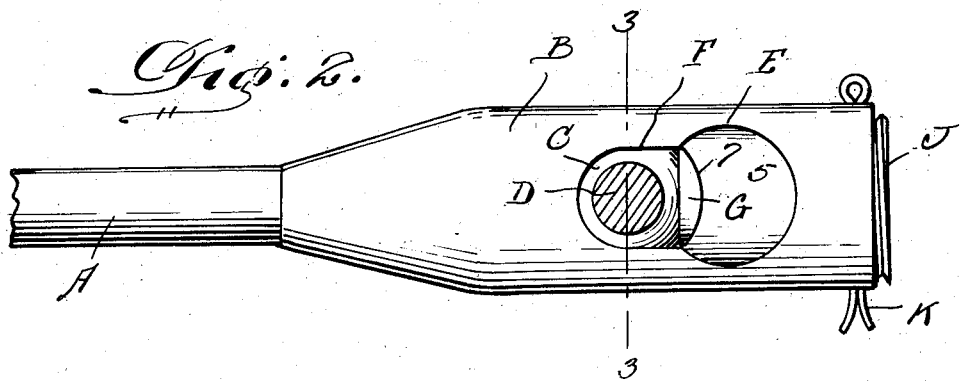
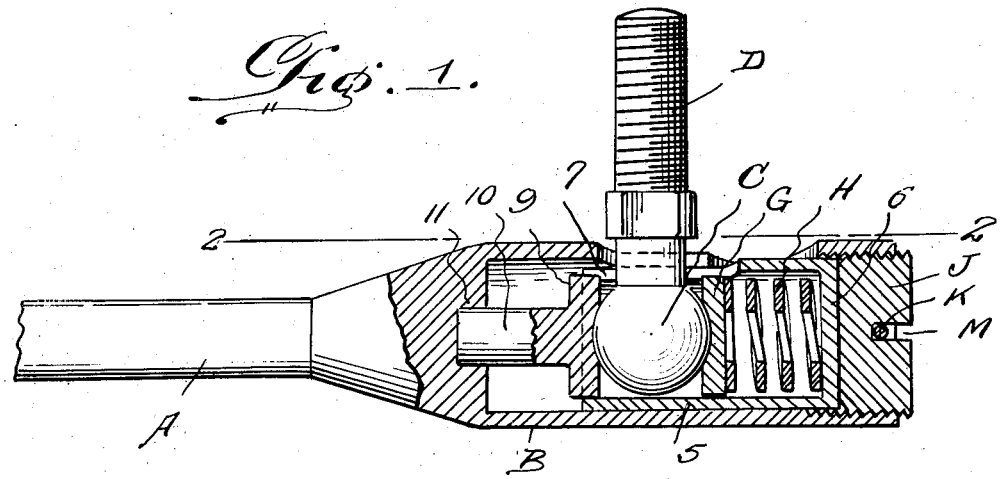
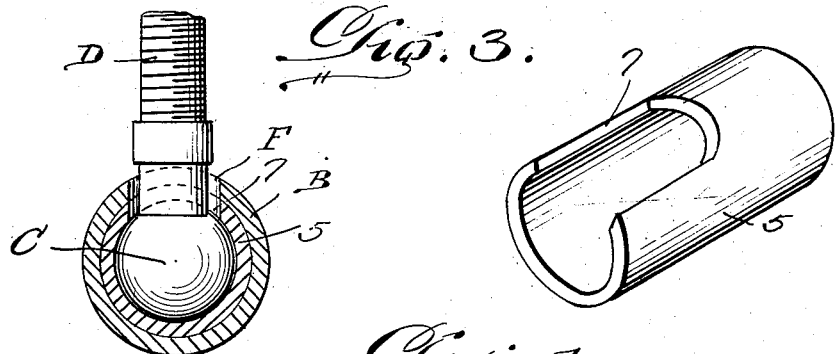
Inventor
M.C. Ridenour,
By *Clarence A. O'Brien*
Attorney Patented May 17, 1927.

1,628,914

UNITED STATES PATENT OFFICE.

MARTIN C. RIDENOUR, OF KINGWOOD, WEST VIRGINIA, ASSIGNOR OF ONE-SIXTH TO THOMAS M. RIDENOUR AND ONE-SIXTH TO MINNIE L. RIDENOUR, BOTH OF KINGWOOD, WEST VIRGINIA.

STEERING CONNECTING ROD FOR AUTOMOBILES.

Application filed December 11, 1925. Serial No. 74,819.

The present invention relates to the steering connecting rod of automobiles and more particularly to the ball and socket joint at the ends thereof.

In the joints now in common use, they are constructed so that if the retaining spring should break or lose its tension, there exists a great danger that the spindle connecting rod yoke ball may become displaced from the socket.

It is the prime object of the present invention to provide positive means for preventing displacement of this ball from either end of the steering connecting rod.

Another very important object of the invention is to provide an improved ball and socket joint which will be efficient in use, strong, durable, compact, convenient to handle, easy to manipulate, not likely to easily become out of order, and otherwise well adapted to the purpose for which it is designed.

With the above and numerous other objects in view as will appear as the description proceeds, the invention resides in certain novel features of construction and in the combination and arrangement of parts as will be hereinafter more fully described and claimed.

In the drawing—

Figure 1 is a sectional elevation of one end of a steering connecting rod embodying the features of my invention, Fig. 2 is a view taken substantially on the line 2—2 of Fig. 1, Fig. 3 is a transverse section taken substantially on the line 3—3 of Fig. 2, and Fig. 4 is a detail perspective of the sleeve.

Referring to the drawing in detail, it will be seen that A designates the connecting rod which is provided at each end with a socket casing B. I have illustrated only one end of the connecting rod since both ends are identical in formation. I will, therefore, describe only one end in detail. The letter C designates the usual steering gear connecting rod yoke ball having the usual shank D. The socket casing B is provided with a longitudinally extending slot having one end E larger than the diameter of the ball C to permit the insertion of said ball and the other end F smaller than the diameter of the ball C but larger than the diameter of the shank D.

A retainer G is impinged against the ball C by a spring H which is tensioned by the plug J threaded in the open end of the socket casing B. A cotter pin K pierces transversely the open end of the socket casing B and extends through the groove M provided in the plug J for locking this plug against accidental displacement. The parts thus far described are well known in the art and no novelty in these elements themselves is claimed by me except in as far as they are in the combinations claimed hereinafter.

The parts thus far described practically form the complete ball and socket joint which is now in common use on steering connecting rods. It has frequently happened that the spring H loses its tension or becomes broken so that the ball C is free to move in registry with the larger end E of the slot of the socket casing B and thus become displaced therefrom. This displacement of the ball is the cause of a large number of accidents.

Referring now particularly to my improved structure for preventing the displacement of the ball C even though the spring H becomes broken or loses its tension, it will be seen that 5 designates a sleeve which is rotatable and slidably receivable in the socket casing B. This sleeve 5 has its outer end closed as is indicated at 6 while its inner end is open. A slot 7 is provided in the sleeve 5 to extend longitudinally from the open end of said sleeve and to terminate a distance from the closed end 6 thereof. The width of this slot 7 is substantially the same as the width of the end F of the slot in the socket casing B.

The spring H and the retainer G are receivable in the sleeve 5, one end of the spring H engaging the closed end 6 as is clearly illustrated in Fig. 1. The sleeve is then placed into the socket casing B through the open end thereof, ball C having previously been positioned in its proper place.

It will thus be seen that the ball C will be positioned in the open end of this sleeve.

I also provide an additional retainer 9, against which the ball C is impinged by the retainer G and spring H. This additional retainer G is provided with a spindle shank 10 that is receivable in a counterbore 11 which I provide in the closed end of the socket casing B.

From the above description in detail, it will be seen that with my additional improved elements, should the spring H break or lose its tension, that it is impossible for the ball C to become displaced from the socket, because the width of the slot 7 is less than the diameter of the ball C. It is further to be noted that the sleeve 5 functions as an additional bearing since it is rotatable and slidable in the socket, thus assisting in the elimination of friction and more particularly in preventing excessive wear of the ball C, as is occasioned by the present mounting of the ball since the rotation of the sleeve will take up some of this wear.

The present embodiment and use of the invention has been disclosed merely by way of example, since in actual practice it attains the features of advantage enumerated as desirable in the statement of the invention and the above description. It will be apparent that changes in the details of construction, and in the combination and arrangement of the parts may be resorted to without departing from the spirit or scope of the invention as hereinafter claimed.

Having thus described my invention, what I claim as new is:—

In combination with a ball and socket joint; wherein the joint includes a socket casing having one end open and having a slot, a ball for reception in the socket casing, one end of the slot being larger than the ball to permit insertion of the ball in the casing and the other end being smaller than the ball and long enough to permit the projection of a shank from the ball, a retaining spring in the casing for exerting pressure upon the ball to retain it adjacent the smaller end of the slot, a nut closing the open end of the casing and tensioning the spring to exert pressure upon the ball; of a sleeve rotatably mounted within the socket casing and having one end closed and the other end open and provided with a longitudinally extending slot starting at the open end and terminating a distance from the closed end, the width of said slot being less than the diameter of said ball, said sleeve housing the spring and ball, and said nut being adapted to abut the closed end of said sleeve to tension said spring.

In testimony whereof I affix my signature.

MARTIN C. RIDENOUR.